R. SHAND.
ELECTRICAL MEASURING INSTRUMENT.
APPLICATION FILED MAY 19, 1916.

1,267,914.

Patented May 28, 1918.

Inventor,
Robert Shand,
by
Att'y.

UNITED STATES PATENT OFFICE.

ROBERT SHAND, OF LYNN, MASSACHUSETTS, ASSIGNOR TO GENERAL ELECTRIC COMPANY, A CORPORATION OF NEW YORK.

ELECTRICAL MEASURING INSTRUMENT.

1,267,914.  Specification of Letters Patent.  Patented May 28, 1918.

Application filed May 19, 1916. Serial No. 98,555.

*To all whom it may concern:*

Be it known that I, ROBERT SHAND, a citizen of the United States, residing at Lynn, in the county of Essex and State of Massachusetts, have invented certain new and useful Improvements in Electrical Measuring Instruments, of which the following is a specification.

My invention relates to electrical measuring instruments, and has for its object the provision of certain new and useful improvements in such instruments, and more particularly the provision of a novel and improved instrument of the solenoid type.

The principal aim of my present invention is to provide an accurate and reliable electrical measuring instrument of simple and inexpensive construction, and furthermore to provide such an instrument having a relatively long scale and a substantially dead beat moving element. The instrument of the invention is in principle of the solenoid type, and comprises a stationary current carrying coil and two relatively movable magnetic members whose relative movement actuates the indicator of the instrument. In the preferred form of the instrument the magnetic members are of helical configuration, and one is secured within the current carrying coil and the other is carried by the moving element. The magnetic members are separated by an air gap or space of substantially uniform but variable width, and are magnetically so related that the magnetic flux produced by the flow of current in the coil causes a repelling action between the members whereby a rotary movement is imparted to the moving element. The magnetic members are preferably positioned in an inclosed air chamber in order to secure effective air damping.

Figure 1:
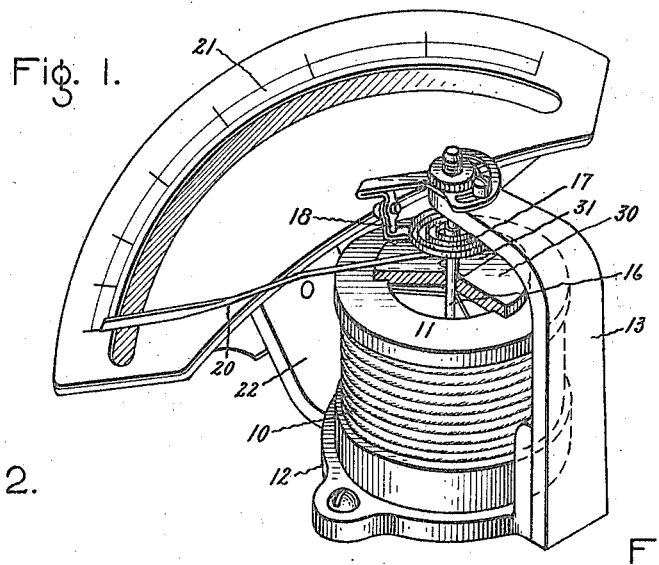
Figure 2:
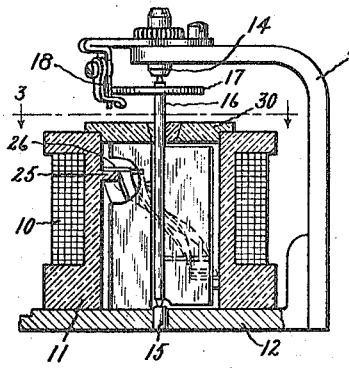
Figure 4:
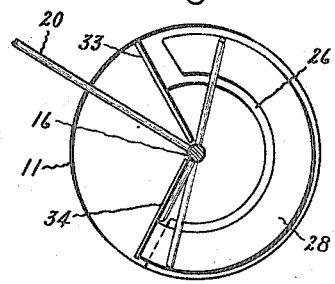
Figure 3:
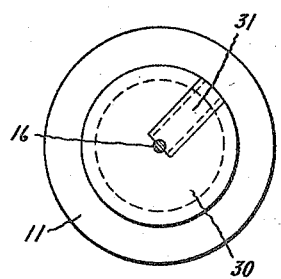
Figure 6:
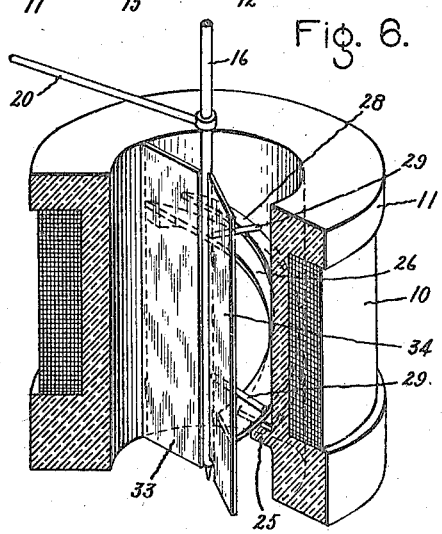
Figure 5:
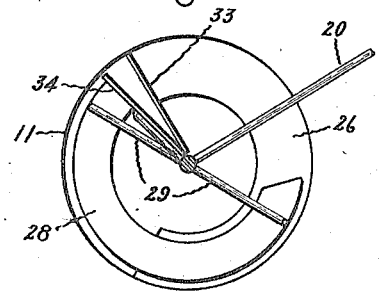

The novel features of the invention which I believe to be patentable are definitely indicated in the claims appended hereto. The principle of the invention and its embodiment in a practical instrument and the mode of operation of the latter will be better understood from the following description taken in conjunction with the accompanying drawings, in which:

Figure 1 is a skeleton view in perspective of an electrical measuring instrument embodying my present invention; Fig. 2 is a sectional elevation of a part of the instrument; Fig. 3 is a plan view taken along the line 3—3, of Fig. 2, looking in the direction of the arrow; Figs. 4 and 5 are plan views of the interior of the supporting spool for the current carrying coil showing the moving element in its two extreme positions; and Fig. 6 is a perspective view partly in section.

The instrument illustrated in the accompanying drawings has a stationary current carrying coil 10 wound on a spool 11 of non-magnetic material. The spool and coil are secured in any suitable way to a base 12. An inverted L-shaped bracket 13 is secured to the base 12, and carries at its upper end a jewel bearing 14. The lower jewel bearing 15 of the instrument is mounted in the base 12. The shaft 16 of the moving element of the instrument is pivotally mounted in the jewel bearings 14 and 15, and is symmetrically positioned substantially in the axis of the coil 10. A spiral control spring 17 is secured at its inner end to the shaft 16 and at its outer end to an adjustable stud 18. A pointer 20 is suitably mounted on the shaft 16 and is adapted to sweep across a scale plate 21 supported on a bracket 22.

The inner wall of the spool 11 has a ledge 25 of helical configuration. A magnetic member or vane 26 of helical configuration is mounted on and suitably secured to this ledge. A second magnetic member or vane 28 also of helical configuration is secured to the shaft 16 by means of two pins 29. It will thus be observed that the lower magnetic member 26 is stationary while the upper magnetic member 28 is movable and that the two magnetic members are substantially parallel, or, in other words, are separated by a substantially uniform air gap or space. The width of the air gap, however, depends upon the position of the moving element, and, therefore, while the air gap between the magnetic members is substantially uniform for any position of the moving element, it is of a different width for every position thereof. The magnetic members 26 and 28 each consists of a slightly greater than semi-circular annular strip. Each strip is operatively mounted in an inclined or oblique position so that it makes an angle of about 40 degrees with a plane perpendicular to the axis of the coil 10. The inclined mounting and circular peripheral outline of the magnetic members results in producing the helical configuration before mentioned.

The top of the spool 11 is closed by a circular cap 30. The cap has a radial slot to enable it to be slipped by the shaft 16 and mounted on the spool, and this slot is closed by a lid 31, as clearly shown in Figs. 1 and 3 of the drawings. The magnetic members 26 and 28 are thus positioned in a substantially closed air chamber, and effective damping is secured by providing a radially positioned partition 33 and air damping vane 34. The partition is secured to the inner wall of the spool adjacent the upper end of the ledge 25 and magnetic member 26 and extends radially, with respect to the spool, nearly to the shaft 16. The air damping vane 34 is secured to the shaft 16 adjacent the lower end of the helical magnetic vane 28 and extends radially nearly to the inner wall of the spool 11. The air churning produced in the substantially closed air chamber as a result of the fixed partition 33 and movable vane 34 produces an excellent damping effect on the moving element.

The instrument is in principle of the solenoid type and the current carrying coil 10 may hence be considered as a solenoid coil. The deflecting force is one of repulsion between the two magnetic members. Thus when current flows through the coil 10 there is a repelling action between the magnetic members 26 and 28 which tends to increase the width of the air gap or space between these members, which results in producing a rotary movement of the shaft 16. An effective scale length of over 140 degrees is obtained by utilizing the oblique arrangement of the magnetic members, where the magnetic members make an angle of about 40 degrees with the plane of the coil. The relative positions of the magnetic members and the stationary and movable air damping vanes will be better understood by reference to Figs. 4 and 5 of the drawings, where Fig. 4 shows the positions of these parts when the moving element is in its initial or zero position, and Fig. 5 shows the positions of the parts when the moving element occupies a position corresponding to full scale deflection.

The instrument of my present invention can be used for measuring either direct currents or alternating currents, and is particularly adapted for use as an alternating current measuring instrument, since it has a reasonably uniform and relatively wide scale. It will be evident that the construction of the instrument is very simple and inexpensive, and that there are no delicate parts to get out of order or requiring skilled attention. The instrument's construction is in fact very rugged, but at the same time its electrical characteristics are reliable and satisfactory.

I have herein shown and particularly described a certain embodiment of my invention for the purpose of explaining its principle, but numerous modifications of the details of construction will present themselves to those skilled in the art. I, therefore, wish to cover by the following claims all modifications within the spirit of the invention.

What I claim as new and desire to secure by Letters Patent of the United States, is:—

1. An electrical measuring instrument comprising a solenoid coil, a magnetic member of helical configuration secured to the inner wall of said coil, a moving element pivotally mounted substantially in the axis of said coil, and a magnetic vane of helical configuration secured to said moving element and separated from said first mentioned magnetic vane by a substantially uniform air gap of a different width for every position of the moving element.

2. An electrical measuring instrument comprising a non-magnetic supporting spool having a helical supporting ledge on its inner wall, a current carrying coil wound on said spool, a stationary magnetic member of helical configuration secured to said ledge, a moving element pivotally mounted substantially in the axis of said spool, and a movable magnetic member of helical configuration secured to said moving element and separated from said first mentioned magnetic member by a space of substantially uniform but variable width.

3. An electrical measuring instrument comprising a non-magnetic supporting spool having a helical supporting ledge on its inner wall, a current carrying coil wound on said spool, a stationary magnetic member of helical configuration secured to said ledge, a moving element pivotally mounted substantially in the axis of said spool, a movable magnetic member of helical configuration secured to said moving element and separated from said stationary magnetic member by a space of substantially uniform but variable width, a closure for the top and bottom of said spool whereby a substantially closed air chamber is formed in which said magnetic members are positioned, a radially positioned partition in said air chamber, and a radially positioned air damping vane secured to said moving element within said air chamber.

In witness thereof, I have hereunto set my hand this seventeenth day of May, 1916.

ROBERT SHAND.

Copies of this patent may be obtained for five cents each, by addressing the "Commissioner of Patents, Washington, D. C."